United States Patent
Gallagher et al.

(10) Patent No.: US 12,125,106 B1
(45) Date of Patent: Oct. 22, 2024

(54) CLOUD-BASED VEHICULAR TELEMATICS SYSTEMS AND METHODS FOR AUTOMATICALLY GENERATING RIDESHARE-BASED RISK PROFILES OF RIDESHARE DRIVERS OF A TRANSPORT NETWORK COMPANY (TNC) PLATFORM

(71) Applicant: STATE FARM MUTUAL AUTOMOBILE INSURANCE COMPANY, Bloomington, IL (US)

(72) Inventors: James M. Gallagher, Bloomington, IL (US); Scott T. Christensen, Salem, OR (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 316 days.

(21) Appl. No.: 17/036,228

(22) Filed: Sep. 29, 2020

Related U.S. Application Data

(60) Provisional application No. 62/908,299, filed on Sep. 30, 2019.

(51) Int. Cl.
  *G06Q 40/08* (2012.01)
  *G06N 20/00* (2019.01)
  (Continued)

(52) U.S. Cl.
  CPC ............. *G06Q 40/08* (2013.01); *G06N 20/00* (2019.01); *G06Q 10/10* (2013.01);
  (Continued)

(58) Field of Classification Search
  None
  See application file for complete search history.

(56) References Cited

U.S. PATENT DOCUMENTS

| 9,311,271 B2 | 4/2016 | Wright |
| 9,633,487 B2 | 4/2017 | Wright |
| (Continued) | | |

FOREIGN PATENT DOCUMENTS

| EP | 3239686 A1 | 11/2017 |
| EP | 3578433 B1 | 8/2020 |
| (Continued) | | |

*Primary Examiner* — William J Jacob
(74) *Attorney, Agent, or Firm* — MARSHALL, GERSTEIN & BORUN LLP

(57) ABSTRACT

Cloud-based vehicular telematics systems and methods are described for automatically generating rideshare-based risk profiles of rideshare drivers of a transport network company (TNC) platform. The systems and methods comprise receiving telematics data originating from sensor(s) traveling with a rideshare vehicle during an operating segment of the rideshare vehicle; and rideshare data originating from a rideshare app configured to execute on a telematics device during one or more portions of the operating segment. The rideshare data indicates a rideshare app mode for each portion of the operating segment. The systems and methods include determining, based on the telematics data, operating state(s) of the rideshare vehicle during the operating segment of the rideshare vehicle, and generating, based on the telematics data and the rideshare data, a rideshare-based risk profile and driver score of a driver.

20 Claims, 5 Drawing Sheets

(51) Int. Cl.
*G06Q 10/10* (2023.01)
*G06Q 30/0201* (2023.01)
*G06Q 30/0204* (2023.01)
*G06Q 40/03* (2023.01)
*G06Q 50/40* (2024.01)
*G07C 5/00* (2006.01)
*G07C 5/08* (2006.01)

(52) U.S. Cl.
CPC ..... *G06Q 30/0201* (2013.01); *G06Q 30/0205* (2013.01); *G06Q 30/0206* (2013.01); *G06Q 40/03* (2023.01); *G06Q 50/40* (2024.01); *G07C 5/008* (2013.01); *G07C 5/0841* (2013.01)

(56) References Cited

U.S. PATENT DOCUMENTS

| | | | |
|---|---|---|---|
| 9,830,748 B2 | 11/2017 | Rosenbaum | |
| 9,990,782 B2 | 6/2018 | Rosenbaum | |
| 10,115,246 B1* | 10/2018 | Goldfarb | G06Q 40/08 |
| 10,192,369 B2 | 1/2019 | Wright | |
| 10,198,879 B2 | 2/2019 | Wright | |
| 10,269,190 B2 | 4/2019 | Rosenbaum | |
| 10,467,824 B2 | 11/2019 | Rosenbaum | |
| 10,895,463 B1* | 1/2021 | Cope | G06Q 10/02 |
| 11,227,452 B2 | 1/2022 | Rosenbaum | |
| 11,370,391 B1* | 6/2022 | Gammelgard | G06Q 10/08 |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 2015/0187019 A1* | 7/2015 | Fernandes | G06Q 40/08 705/4 |
| 2015/0371153 A1* | 12/2015 | Lohmeier | G06Q 40/08 705/5 |
| 2016/0364678 A1* | 12/2016 | Cao | G06Q 10/083 |
| 2018/0059687 A1* | 3/2018 | Hayes | G08G 1/096816 |
| 2018/0348772 A1* | 12/2018 | Stefan | G01C 21/3438 |
| 2019/0244042 A1* | 8/2019 | Yang | G06V 20/59 |
| 2020/0318970 A1* | 10/2020 | Tanaka | G01C 21/14 |
| 2022/0092893 A1 | 3/2022 | Rosenbaum | |
| 2022/0340148 A1 | 10/2022 | Rosenbaum | |
| 2023/0060300 A1 | 3/2023 | Rosenbaum | |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

* cited by examiner

CLOUD-BASED VEHICULAR TELEMATICS SYSTEMS AND METHODS FOR AUTOMATICALLY GENERATING RIDESHARE-BASED RISK PROFILES OF RIDESHARE DRIVERS OF A TRANSPORT NETWORK COMPANY (TNC) PLATFORM

CROSS REFERENCE TO RELATED APPLICATIONS

This application claims the benefit of U.S. Provisional Application No. 62/908,299 (filed on Sep. 30, 2019). The entirety of the provisional application is incorporated by reference herein.

FIELD OF THE DISCLOSURE

The present disclosure generally relates to cloud-based vehicular telematics systems and methods, and more particularly to cloud-based vehicular telematics systems and methods for automatically generating rideshare-based risk profiles of rideshare drivers of a transport network company (TNC) platform.

BACKGROUND

Telematics information regarding operation of passenger vehicles may generally be collected for vehicle trips. The collected telematics data can be used in variable vehicular insurance pricing schemes, including pay-per-mile or pay-per-use, where a vehicle's trips, miles, or otherwise distance traveled may be computed based on the telematics data at some future time period. An invoice, such as an insurance invoice, may then be prepared for a given vehicle or user based on the vehicle trip(s).

A problem arises, however, with respect to applying such typical insurance schemes to vehicles operating in conjunction with TNC platform(s). For example, a TNC may employ or contract with numerous rideshare drivers each having different driving habits, styles, etc. The TNC is generally liable or responsible for any damage or accidents caused by its drivers. The TNC, therefore, experiences difficulties in matching its driver's respective driving habits, styles, etc. to insurance schemes. This is especially true with respect to TNC's that operate across multiple and/or different geographic locations. For this reason, in a known technique, TNC's typically insure all drivers in all locations at the same rate (e.g., same flat rate per mile). However, such practice fails to account for the variability and differences among the TNC's drivers, operating locations, etc.

For the foregoing reasons, there is a need for cloud-based vehicular telematics systems and methods for automatically generating rideshare-based risk profiles of rideshare drivers of a TNC platform.

SUMMARY

The disclosure herein provides numerous solutions and benefits with respect to TNC platforms (e.g., rideshare platforms), where risk models (e.g., of an insurer) and/or proxy risk models (e.g., of a third party, such as a TNC itself) may be developed, to generate unique and particular risk files of drivers operating within the TNC platform. As contemplated herein, TNC platforms may include platforms of TNC operators, such as LYFT, UBER, or other such similar TNC operators providing rideshare or other TNC services. The disclosure herein provides solutions to overcome the disparate effects of different drivers operating within different locations, and such effects impact(s) on a TNC and its platform as a whole. For example, currently, no models are used to assess risk (or provide related prices or premiums) for specific TNC drivers. Instead, TNC operators are typically provided with a flat rate for each region (e.g., each U.S. state) that assumes that risk is geographically equal and for each driver.

Accordingly, in various embodiments disclosed herein, a cloud-based vehicular telematics system is configured to automatically generate rideshare-based risk profiles of rideshare drivers of a transport network company (TNC) platform. The cloud-based vehicular telematics system may include a telematics mobile application (app) configured to execute on a telematics device. In some embodiments the telematics app may be computing instructions implemented on a processor of a mobile phone. Additionally, or alternatively, the telematics app may be computing instructions implemented on a processor embedded in a vehicle. The telematics mobile app is operable to collect telematics data from one or more sensors traveling with a rideshare vehicle during an operating segment of the rideshare vehicle. The cloud-based vehicular telematics system may further include a telematics server communicatively coupled, via a computer network, to the telematics mobile application. The telematics server may be configured to receive the telematics data from the telematics mobile app during the operating segment. The cloud-based vehicular telematics system may further include a computer memory communicatively coupled the telematics server and storing instructions that when executed by one or more processors of the telematics server, cause the telematics server to receive, from the computer network, rideshare data originating from a rideshare app. In various embodiments, the rideshare app may be configured to execute on the telematics device during one or more portions of the operating segment. The rideshare data may indicate a rideshare app mode for each portion of the one or more portions of the operating segment. In addition, the rideshare app mode selected from (1) a rideshare active mode, or (2) a rideshare inactive mode. In some embodiments, the rideshare active mode may comprise subcategories or sub-modes including each of one or more of: (1a) phase 1: "app on," (1b) phase 2: "en route," and (1c) phase 3 "with a passenger." Each of these sub-modes made be included as part of the rideshare data and may be used in the determinations, calculations, or otherwise herein where the telematics data and/or rideshare data is computed, described, or otherwise used. In addition, in some embodiments, the one or more processors of the telematics server may execute the instructions to determine, based on the telematics data, one or more operating states of the rideshare vehicle during the operating segment of the rideshare vehicle. In still further embodiments, the one or more processors of the telematics server may execute the instructions to generate, based on the telematics data and/or the rideshare data, a rideshare-based risk profile of a driver of the rideshare vehicle. In some embodiments, the rideshare-based risk profile may include a rideshare driver score of the driver.

In still further embodiments, a cloud-based vehicular telematics method for automatically generating rideshare-based risk profiles of rideshare drivers of a TNC platform is disclosed. The cloud-based vehicular telematics method may include receiving, from a telematics app executing on a telematics device, telematics data from one or more sensors traveling with a rideshare vehicle during an operating segment of the rideshare vehicle. The cloud-based vehicular telematics method may further include receiving, from a computer network, rideshare data originating from a rideshare app configured to execute on the telematics device during one or more portions of the operating segment. The rideshare data may indicate a rideshare app mode for each portion of the one or more portions of the operating segment. In various embodiments, the rideshare app mode may be selected from (1) a rideshare active mode, or (2) a rideshare inactive mode. The cloud-based vehicular telematics method may further include determining, based on the telematics data, one or more operating states of the rideshare vehicle during the operating segment of the rideshare vehicle. The cloud-based vehicular telematics method may further include generating, based on the telematics data and/or the rideshare data, a rideshare-based risk profile of a driver of the rideshare vehicle. The rideshare-based risk profile may include a rideshare driver score of the driver.

In still further embodiments, a tangible, non-transitory computer-readable medium storing instructions for automatically generating rideshare-based risk profiles of rideshare drivers of a TNC platform is disclosed. The instructions, when executed by one or more processors, cause the one or more processors to receive, from a telematics app executing on a telematics device, telematics data from one or more sensors traveling with a rideshare vehicle during an operating segment of the rideshare vehicle. In addition, the instructions, when executed by one or more processors, cause the one or more processors to receive, from a computer network, rideshare data originating from a rideshare app. The rideshare may be configured to execute on the telematics device during one or more portions of the operating segment. In addition, the rideshare data may indicate a rideshare app mode for each portion of the one or more portions of the operating segment. In some embodiments, the rideshare app mode may be selected from (1) a rideshare active mode, or (2) a rideshare inactive mode. In some embodiments, the instructions, when executed by one or more processors, may cause the one or more processors to determine, based on the telematics data, one or more operating states of the rideshare vehicle during the operating segment of the rideshare vehicle. In still further embodiments, the instructions, when executed by one or more processors, may cause the one or more processors to generate, based on the telematics data and/or the rideshare data, a rideshare-based risk profile of a driver of the rideshare vehicle. The rideshare-based risk profile may include a rideshare driver score of the driver.

In accordance with the above, and with the disclosure herein, the aspects of the present disclosure include improvements in computer functionality or in improvements to other technologies at least because the claims recite, e.g., cloud-based vehicular telematics systems and methods configured to automatically generate rideshare-based risk profiles of rideshare drivers of a TNC platform. That is, the present disclosure describes improvements in the functioning of the computer itself or "any other technology or technical field" because a computer or server (e.g., telematics server, as describe herein) is improved with a risk model or proxy model generated based on telematics data from multiple, disparate drivers that may be varied across driving styles, habits and in a variety of geographic locations. This improves over the prior art at least because the predictive ability of the computer or server is improved as to determining risk among the various drivers and various geographies, especially when considered against typical flat rate models.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

Figure 1A:
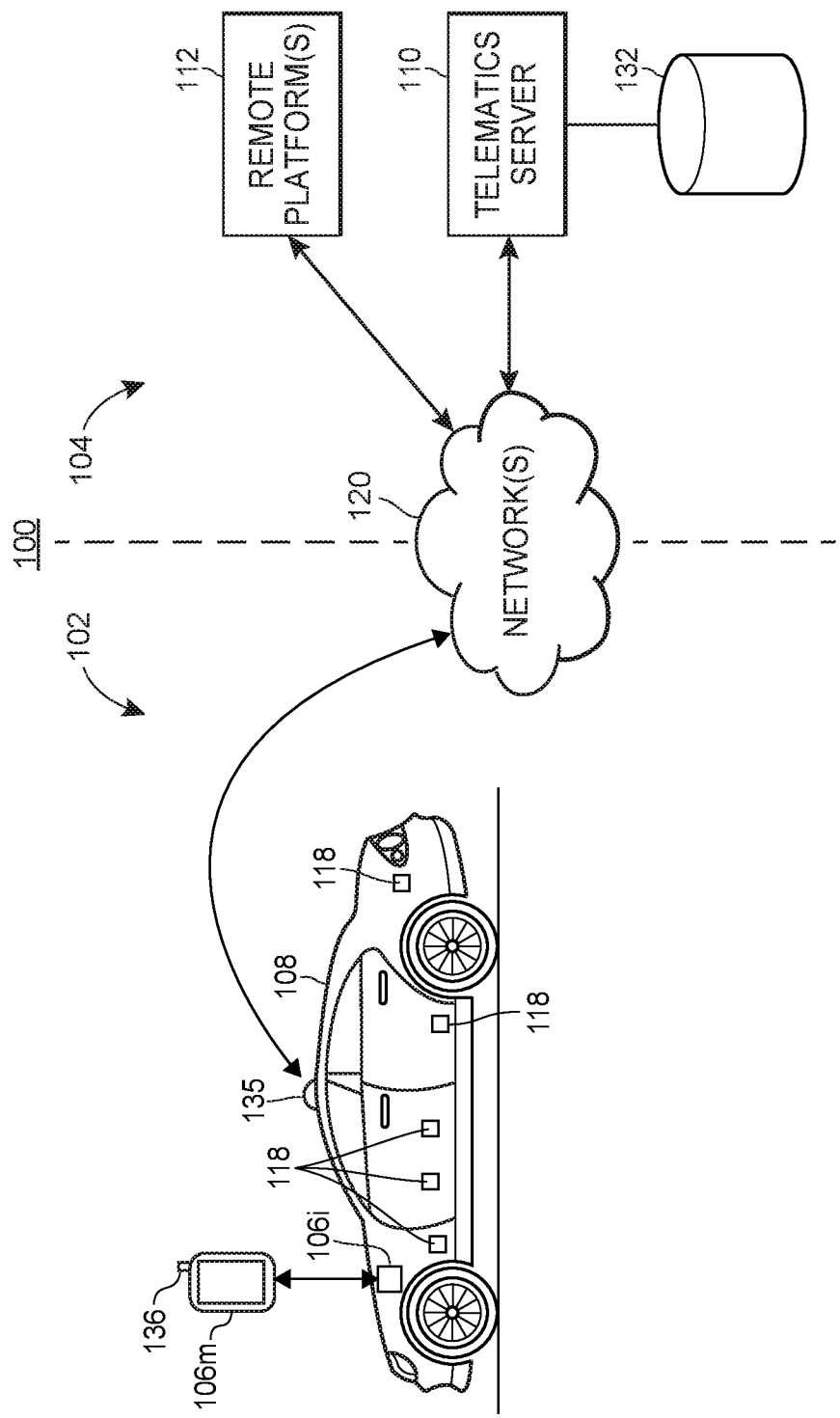
FIG. 1A illustrates a telematics cloud platform configured to receive vehicular telematics data from a telematics device onboard a vehicle in accordance with various embodiments disclosed herein.

FIG. 1A illustrates a telematics cloud platform 100 configured to receive vehicular telematics data from a telematics device onboard a vehicle 108, which includes infrastructure, including hardware devices, as described for various telematics system and methods embodiments herein. In particular, FIG. 1A illustrates a telematics server 110 configured to receive vehicular telematics data from one or more telematics devices (e.g., telematics device 106*i* and/or mobile device 106*m*) onboard a vehicle 108. As the term is used herein, "telematics data" may include vehicle specific data, sensor data, and/or vehicle environment related data that is generated, collected, monitored, measured, transmitted and/or otherwise manipulated by one or more telematics devices (e.g., telematics device 106*i* and/or mobile device 106*m*) or sensors associated with a vehicle. The telematics data may include various metrics that indicate the direction, speed, acceleration, braking, cornering, and/or motion of the vehicle in which the data is associated. Such data may be determined from sensors (e.g., sensors 118) on board the vehicle, a mobile telematics device traveling with the vehicle, GPS systems, or other such device described herein. The telematics data may include geographic position information defining a geographic location of a telematics device associated with a vehicle. Such data may include latitude and longitude coordinates, for example. The telematics data may further include time value of the geographic position information, defining a specific point in time the telematics device was at a given geographic location.

Generally, telematics cloud platform 100 may include both hardware and software components, where software components may execute on the hardware devices. Telematics cloud platform 100 may communicate via various data communication channels for communicating data (e.g., telematics data) between and among the various components. It should be appreciated that telematics cloud platform 100 is merely an example and that alternative or additional components are envisioned.

As illustrated in FIG. 1A, telematics cloud platform 100 may be segmented into a set of front-end components 102 and a set of back-end components 104. The front-end components 102 may include a vehicle 108 which may be, for example, an automobile, a car, a truck, a tow truck, a snowplow, a boat, a motorcycle, a motorbike, a scooter, a recreational vehicle, or any other type of vehicle capable of roadway or water travel. Telematics device 106i may be permanently or removably installed onboard vehicle 108, and may generally be an on-board computing device capable of performing various functionalities relating to vehicular telemetric data generation, collection, and/or transmission. For example, in some embodiments, telematics device 106i may be an integrated device of the vehicle. Further, telematics device 106i may be installed by the manufacturer of vehicle 108, or as an aftermarket modification or addition to vehicle 108. In FIG. 1A, although only one telematics device 106i is depicted, it should be understood that in some embodiments, a plurality of computers telematics devices 106i (which may be installed at one or more locations within vehicle 108) may be used.

Telematics cloud platform 100 may further include mobile device 106m that may be associated with vehicle 108, where mobile device 106m may be any type of electronic device such as a smartphone, notebook computer, tablet, "phablet," GPS (Global Positioning System) or GPS-enabled device, smart watch, smart glasses, smart bracelet, wearable electronic, PDA (personal digital assistants), pager, computing device configured for wireless communication, and/or the like. Mobile device 106m may implement one or more mobile operation systems, such as APPLE IOS or GOOGLE ANDROID. Mobile device 106m may be equipped or configured with a set of sensors, such as a location module (e.g., a GPS chip), an image sensor, an accelerometer, a clock, a gyroscope, a compass, a yaw rate sensor, a tilt sensor, and/or other sensors.

Mobile device 106m may belong to or be otherwise associated with a user (e.g., a driver of vehicle 108), where the user may be an owner of vehicle 108 or otherwise associated with vehicle 108. For example, in some embodiments, mobile device 106m may be a mobile device of a user, where such mobile device performs any and/or all of a telematics device as described herein. For example, the user may rent vehicle 108 for a variable or allotted time period, or the individual may at least partially operate (or be a passenger of) vehicle 108 as part of a ride share. Generally, the user may at least partially operate vehicle 108 (and may thus be an operator of the vehicle), or may be a passenger of vehicle 108 (e.g., if vehicle 108 is an autonomous vehicle). According to embodiments, a user may carry or otherwise have possession of mobile device 106m during operation of vehicle 108, regardless of whether the individual is the operator or passenger of vehicle 108.

In some embodiments, telematics device 106i may operate in conjunction with mobile device 106m to perform any or all of the functions described herein, including generating, collecting, and/or transmitting telematics data as described herein. In other embodiments, telematics device 106i may perform any or all of the on-board vehicle functions described herein, in which case mobile device 106m may not be present or may not be connected to telematics device 106i. In still other embodiments, mobile device 106m may perform any or all of the onboard functions described herein.

Telematics device 106i and/or mobile device 106m may communicatively interface with one or more on-board sensors 118 that are disposed on or within vehicle 108 and that may be utilized to monitor vehicle 108 and the environment in which vehicle 108 is operating. In particular, the one or more on-board sensors 118 may sense conditions associated with vehicle 108 and/or associated with the environment in which vehicle 108 is operating, and may generate telematics data indicative of the sensed conditions. For example, the telematics data may include a location and/or operation data indicative of operation of vehicle 108. In some configurations, at least some of the on-board sensors 118 may be fixedly disposed at various locations on vehicle 108. Additionally or alternatively, at least some of the on-board sensors 118 may be incorporated within or connected to telematics device 106i. Still additionally or alternatively, in some configurations, at least some of the on-board sensors 118 may be included on or within mobile device 106m.

The on-board sensors 118 may communicate respective telematics data to telematics device 106i and/or to mobile device 106m, and the telematics data may be processed using telematics device 106i and/or mobile device 106m to determine when vehicle 108 is in operation as well as determine information regarding operation of vehicle 108. In some situations, the on-board sensors 118 may communicate respective telematics data indicative of the environment in which vehicle 108 is operating. For example, telematics device 106i and/or mobile device 106m may additionally be configured to obtain geographic location data and/or telematics data by communicating with sensors 118. In some embodiments, on-board computer 114 may obtain geographic location data via communication with a vehicle-integrated global navigation satellite system (GNSS), GPS, etc. To provide additional examples, on-board computer 114 may obtain one or more metrics related to the speed, direction, and/or motion of vehicle 108 via any number of suitable sensors (e.g., sensors 118), which can include speedometer sensors, braking sensors, airbag deployment sensors, crash detection sensors, accelerometers, etc.

According to embodiments, the sensors 118 may include one or more of a GPS unit, a radar unit, a LIDAR unit, an ultrasonic sensor, an infrared sensor, some other type of electromagnetic energy sensor, a microphone (e.g., to support detect/listen for audio/sound wave of siren(s) associated with an emergency vehicle), a radio (e.g., to support wireless emergency alerts or an emergency alert system), an inductance sensor, a camera, an accelerometer, an odometer, a system clock, a gyroscope, a compass, a geo-location or geo-positioning unit, a location tracking sensor, a proximity sensor, a tachometer, a speedometer, and/or the like. Some of the on-board sensors 118 (e.g., GPS, accelerometer, or tachometer units) may provide telematics data indicative of, for example, the vehicle's 108 location, speed, position acceleration, direction, responsiveness to controls, movement, etc.

Other sensors 118 may be directed to the interior or passenger compartment of vehicle 108, such as cameras, microphones, pressure sensors, weight sensors, thermometers, or similar sensors to monitor any passengers, operations of instruments included in vehicle 108, operational behaviors of vehicle 108, and/or conditions within vehicle 108. For example, on-board sensors 118 directed to the interior of vehicle 108 may provide telematics data indicative of, for example, in-cabin temperatures, in-cabin noise levels, data from seat sensors (e.g., indicative of whether or not an individual is using a seat, and thus the number of passengers being transported by vehicle 108), data from seat belt sensors, data regarding the operations of user controlled devices such as windshield wipers, defrosters, traction control, mirror adjustment, interactions with on-board user interfaces, etc. Additionally, the on-board sensors 118 may further detect and monitor the health of the occupant(s) of vehicle 108 (e.g., blood pressure, heart rate, blood sugar, temperature, etc.).

In various embodiments of telematics cloud platform 100, front-end components 102 may communicate collected telematics data to back-end components 104 (e.g., via a network(s) 120). In particular, at least one of telematics device 106*i* or mobile device 106*m* may communicate with back-end components 104 via the network(s) 120 to enable back-end components 104 to receive and/or store collected telematics data and information regarding usage of vehicle 108.

The network(s) 120 may include a proprietary network, a secure public internet, a virtual private network, and/or some other type of network, such as dedicated access lines, plain ordinary telephone lines, satellite links, cellular data networks, combinations of these and/or other types of networks. The network(s) 120 may utilize one or more radio frequency communication links to communicatively connect to vehicle 108, e.g., utilize wireless communication link(s) to communicatively connect with mobile device 106*m* and telematics device 106*i*. Where the network(s) 120 comprises the Internet or other data packet network, data communications may take place over the network(s) 120 via an Internet or other suitable data packet communication protocol. In some arrangements, the network(s) 120 additionally or alternatively includes one or more wired communication links or networks.

Back-end components 104 include one or more servers or computing devices, which may be implemented as a server bank/server farm, or cloud computing platform, and is interchangeably referred to herein as telematics server 110. Telematics server 110 may include one or more computer processors adapted and configured to execute various software applications and components of telematics cloud platform 100, in addition to other software components, as described herein.

Telematics server 110 may further include or be communicatively connected to one or more data storage devices 132 (e.g., databases), which may be adapted to store telematics data related to the operation of vehicle 108, or GUI value data that is determined from telematics data, as described herein. For example, the one or more data storage devices 132 may be implemented as a data bank or a cloud data storage system, at least a portion of which may be locally accessed by telematics server 110 using a local access mechanism such as a function call or database access mechanism (e.g., SQL), and/or at least a portion of which may be remotely accessed by telematics server 110 using a remote access mechanism such as a communication protocol. Telematics server 110 may access data stored in the one or more data storage devices 132 when executing various functions and tasks associated with the present disclosure, including for example, receiving telematics data from telematics device 106*i* and/or mobile device 106*m*, and/or transmitting GUI values to a telematics mobile app as described herein.

Back-end components 104 may further include one or more remote platform(s) 112, which may be any system, entity, repository, or the like, capable of obtaining and storing data, processing data, or returning values or data associated with vehicle operation as described herein. Although FIG. 1A depicts the set of remote platform(s) 112 as separate from the one or more data storage devices 132, it should be appreciated that the set of remote platform(s) 112 may be included as part of the one or more data storage devices 132. In some embodiments, the remote platform(s) 112 may store or process data indicative of vehicle operation regulations. For example, the third-party source 112 may store speed limit information, direction of travel information, lane information, map information, route information, and/or similar information. The remote platform(s) 112 may also maintain or obtain real-time data indicative of traffic signals for roadways (e.g., which traffic signals currently have red lights or green lights). It should be appreciated that the one or more data storage devices or entities 132 may additionally or alternatively store the data indicative of vehicle operation regulations.

To communicate with telematics server 110 and other portions of back-end components 104, front-end components 102 may include a communication component(s) 135, 136 that are configured to transmit information to and receive information from back-end components 104. The communication components 135, 136 may include one or more wireless transmitters or transceivers operating at any desired or suitable frequency or frequencies.

Wireless transmitters or transceivers may operate at different frequencies and/or by using different protocols, if desired. In an example, mobile device 106*m* may include a respective communication component 136 for sending or receiving information to and from telematics server 110 via the network(s) 120, such as over one or more radio frequency links or wireless communication channels which support a first communication protocol (e.g., GSM, CDMA, LTE, one or more IEEE 802.11 standards such as Wi-Fi, WiMAX, BLUETOOTH, etc.). Additionally or alternatively, telematics device 106*i* may operate in conjunction with an on-board transceiver or transmitter 135 that is disposed at vehicle 108 (which may, for example, be fixedly attached to vehicle 108) for sending or receiving information to and from telematics server 110 via the network(s) 120, such as over one or more radio frequency links or wireless communication channels which support the first communication protocol and/or a second communication protocol.

In some embodiments, telematics device 106*i* may operate in conjunction with mobile device 106*m* to utilize the communication component 136 of mobile device 106*m* to deliver telematics data to back-end components 104. Similarly, telematics device 106*i* may operate in conjunction with mobile device 106*m* to utilize the communication component 135 of vehicle 108 to deliver telematics data to back-end components 104. In some embodiments, the communication components 135, 136 and their respective links may be utilized by telematics device 106i and/or mobile device 106m to communicate with back-end components 104.

Accordingly, either one or both of mobile device 106m or telematics device 106i may communicate (e.g., send telematics data) via network(s) 120 over the link(s). Additionally, in some configurations, mobile device 106m and telematics device 106i may communicate with one another directly over a wireless or wired link. Telematics device 106i and/or mobile device 106m disposed at vehicle 108 may communicate via the network(s) 120 and the communication component(s) 135, 136 by using one or more suitable wireless communication protocols (e.g., GSM, CDMA, LTE, one or more IEEE 802.11 Standards such as Wi-Fi, WiMAX, BLUETOOTH, etc.).

Figure 1B:
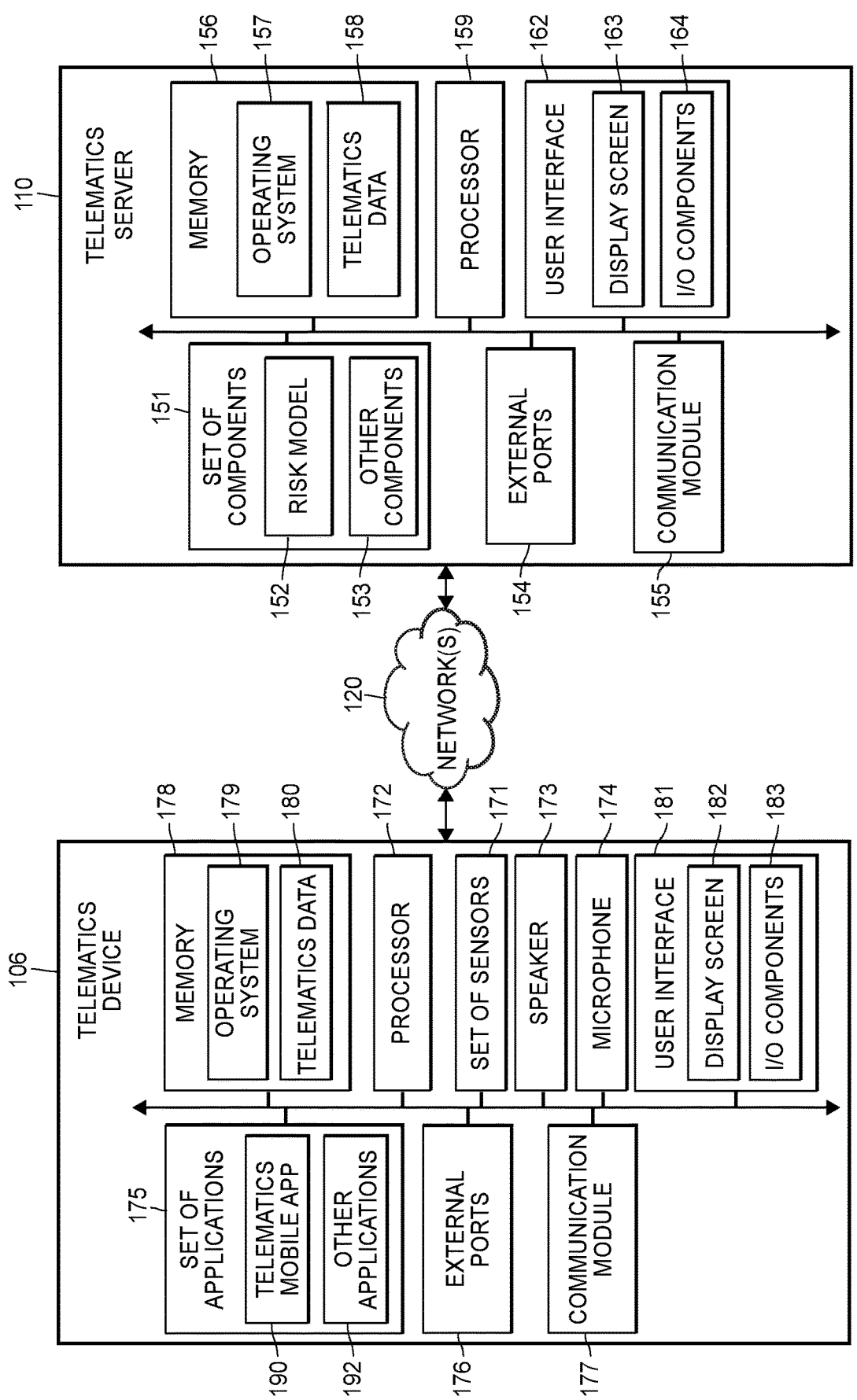
FIG. 1B illustrates a block diagram of the telematics cloud platform and the telematics device of FIG. 1A in accordance with various embodiments disclosed herein.

FIG. 1B illustrates a block diagram of telematics server 110 and a telematics device 106 (e.g., telematics device 106i and/or mobile device 106m) of FIG. 1A in accordance with various embodiments disclosed herein. In particular, FIG. 1B illustrates a hardware diagram of an example telematics device 106 (such as telematics device 106i and/or mobile device 106m as discussed with respect to FIG. 1A) and an example telematics server 110 (e.g., telematics server 110 as discussed with respect to FIG. 1A), in which the systems and methods as discussed herein may be implemented.

As shown in FIG. 1B, telematics device 106 may include a processor 172 as well as a memory 178. Memory 178 may store an operating system 179 capable of facilitating the functionalities as discussed herein as well as a set of applications 175 (i.e., machine readable instructions). For example, one of the set of applications 175 may be a telematics mobile app 190 configured to facilitate several of the functionalities as discussed herein. It should be appreciated that one or more other applications 192 are envisioned, such as an application for generating, collecting, monitoring, measuring, and/or transmitting telematics data via telematics device 106 as described herein.

Processor 172 may interface with the memory 178 to execute the operating system 179 and the set of applications 175. According to some embodiments, the memory 178 may also include telematics data 180 including data accessed or collected from a set of sensors (e.g., sensors 118) or directly via a telematics device (e.g., telematics device 106i and/or mobile device 106m). The memory 178 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Telematics device 106 may further include a communication module 177 configured to communicate data via one or more networks 120. According to some embodiments, the communication module 177 may include one or more transceivers (e.g., WWAN, WLAN, and/or WPAN transceivers) functioning in accordance with IEEE standards, 3GPP standards, or other standards, and configured to receive and transmit data via one or more external ports 176. For example, the communication module 177 may interface with another device, component, or sensors via the network(s) 120 to retrieve sensor data.

In some embodiments, telematics device 106 may include a set of sensors 171 such as, for example, a location module (e.g., a GPS chip), an image sensor, an accelerometer, a clock, a gyroscope, a compass, a yaw rate sensor, a tilt sensor, telematics sensors, and/or other sensors. Telematics device 106 may further include user interface 181 configured to present information to a user and/or receive inputs from the user. As shown in FIG. 1A, the user interface 181 may include a display screen 182 and I/O components 183 (e.g., ports, capacitive or resistive touch sensitive input panels, keys, buttons, lights, LEDs). According to some embodiments, the user may access telematics device 106 via the user interface 181 (e.g., a graphical user interface (GUI)) to review information, make selections, and/or perform other functions. Additionally, telematics device 106 may include a speaker 173 configured to output audio data and a microphone 174 configured to detect audio.

In some embodiments, telematics device 106 may perform the functionalities as discussed herein as part of a "cloud" network (e.g., via network(s) 120 and telematics server 110) or may otherwise communicate with other hardware devices or software components within the cloud to send, retrieve, or otherwise analyze data. In some embodiments, telematics server 110 may operate as a Software-as-a-Service (SaaS) or Platform-as-a-Service (Paas), providing the functionality of telematics server 110 remotely to software apps and other components in accordance with the various embodiments described herein.

As illustrated in FIGS. 1A and 1B, telematics device 106 may communicate and interface with telematics server 110 via the network(s) 120. Telematics server 110 may include a processor 159 as well as a memory 156. The memory 156 may store an operating system 157 capable of facilitating the functionalities as discussed herein as well as a set of components 151 (i.e., machine readable instructions). For example, one of the set of components 151 may include risk model 152 configured to facilitate several of the functionalities discussed herein. It should be appreciated that one or more other components 153 are envisioned.

The processor 159 may interface with the memory 156 to execute the operating system 157 and the set of applications 151. According to some embodiments, the memory 156 may also include telematics data 158, such as telematics data received from telematics device 106, and/or other data, other data as described herein. The memory 456 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Telematics server 110 may further include a communication module 155 configured to communicate data via the one or more networks 120. According to some embodiments, the communication module 155 may include one or more transceivers (e.g., WWAN, WLAN, and/or WPAN transceivers) functioning in accordance with IEEE standards, 3GPP standards, or other standards, and configured to receive and transmit data via one or more external ports 154. For example, the communication module 155 may receive, from telematics device 106, a set(s) of sensor data.

Telematics server 110 may further include user interface 162 configured to present information to a user and/or receive inputs from the user. As shown in FIG. 1A, the user interface 162 may include a display screen 163 and I/O components 464 (e.g., ports, capacitive or resistive touch sensitive input panels, keys, buttons, lights, LEDs). According to some embodiments, the user may access telematics server 110 via the user interface 162 to review information, make changes, input training data, and/or perform other functions.

In some embodiments, telematics server 110 may perform the functionalities as discussed herein as part of a "cloud" network or may otherwise communicate with other hardware or software components within the cloud to send, retrieve, or otherwise analyze data.

In general, a computer program product in accordance with any embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 172, 159 (e.g., working in connection with the respective operating systems 179, 157) to facilitate the functions as described herein. In this regard, the program code may be implemented in any desired language, and may be implemented as machine code, assembly code, byte code, interpretable source code or the like (e.g., via Golang. Python, Scala, C, C++, Java, Actionscript, Objective-C, JavaScript, CSS, XML). In some embodiments, the computer program product may be part of a cloud network of resources.

Figure 2:
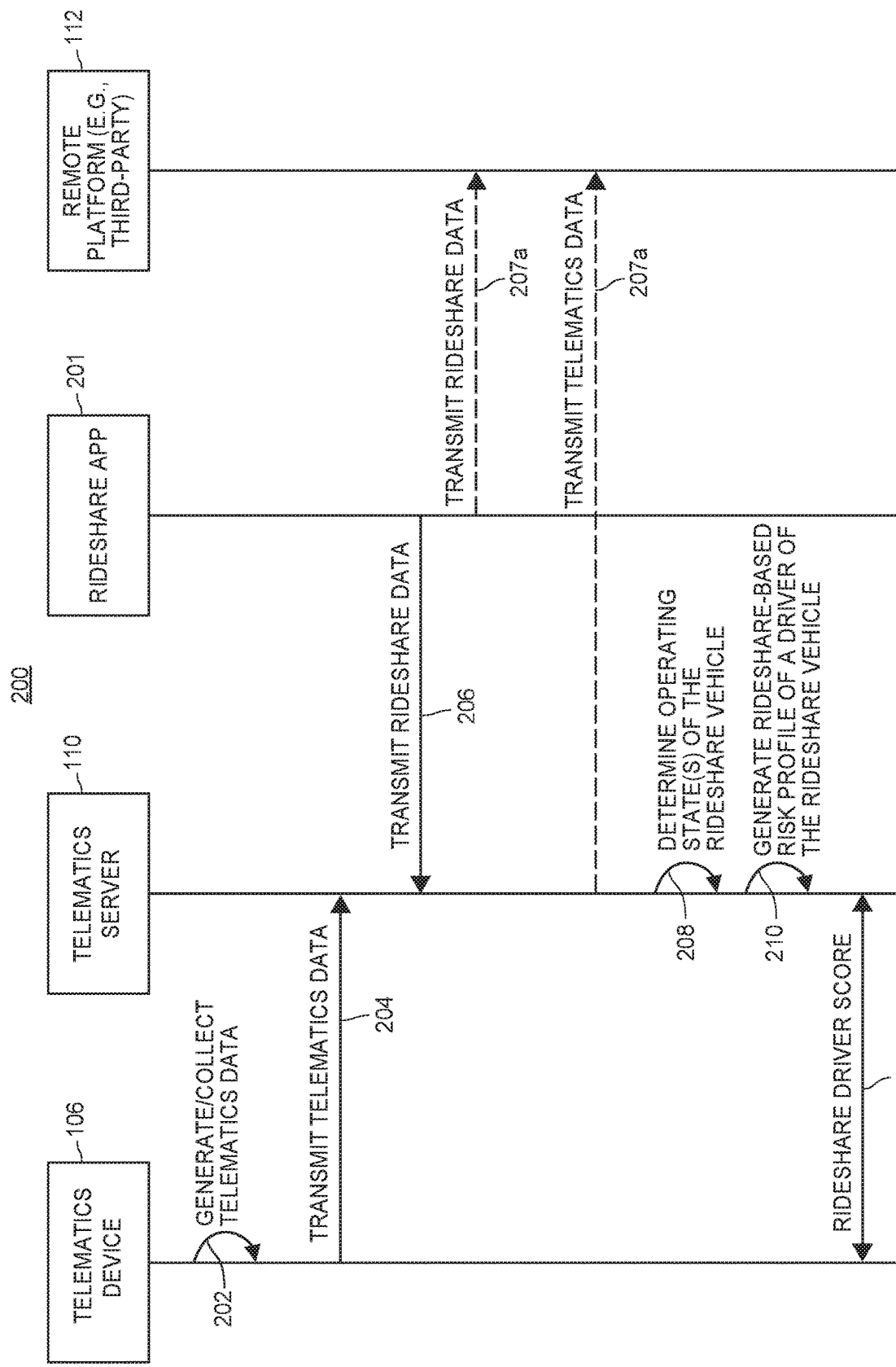
FIG. 2 illustrates a data transmission and implementation diagram of an example cloud-based vehicular telematics system for automatically generating rideshare-based risk profiles of rideshare drivers of a TNC platform in accordance with various embodiments herein.

FIG. 2 illustrates a data transmission and implementation diagram of an example cloud-based vehicular telematics system 200 for automatically generating rideshare-based risk profiles of rideshare drivers of a TNC platform (e.g., remote platform 112) in accordance with various embodiments herein. Cloud-based vehicular telematics system 200 may include all, or part, of the computing devices, features, and/or other functionality as described herein for FIGS. 1A and 1B. Accordingly, the disclosure for FIGS. 1A and 1B applies the same or similarly for FIG. 2. In particular, cloud-based vehicular telematics system 200 includes telematics device 106 (e.g., telematics device 106i and/or mobile 106m), telematics server 110, and remote platform 112, each as described herein with respect to FIGS. 1A and 1B.

In the embodiment of FIG. 2, telematics device 106 generates and/or collects (202) telematics data associated with operation of a rideshare vehicle (e.g., vehicle 108) during one or more vehicle trips of the vehicle, such as during an operating segment of a rideshare vehicle of a TNC platform (e.g., remote platform 112). Telematics device 106 (e.g., telematics device 106i and/or mobile device 106m) may collect the telematics data, e.g., via sensors 118, GPS systems, or other systems or components as described herein for FIGS. 1A and 1B. In this way, vehicular telematics data, as described herein, may define an operating segment of the rideshare vehicle (e.g., vehicle 108). In various embodiments, a plurality of vehicular telematics defining an operating segment of the rideshare vehicle, or otherwise a vehicular trip of a vehicle, may comprise a telematics dataset having a certain data size (e.g., several gigabytes or megabytes of data). The data size is generally proportional to the number of telematics data records collected for the vehicle trip.

In some embodiments, the telematics data, as generated or collected by telematics device 106, may include thousands, and in some instances millions or more, records of data. For example, in certain embodiments the telematics data may comprise 15 Hertz (Hz) data, such as telematics data that is generated or collected 15 times per second. In such embodiments, a trip with a duration of 10 minutes would result in the generation and/or collection of 9,000 telematics data records.

A telematics data record, as the term is used herein, may refer to an instance of vehicle or vehicle environment data determined at a particular time. For example, in various embodiments herein, each telematics data record of a plurality of telematics data may include a geographic position of a telematics device (e.g., telematics device 106i and/or mobile device 106m) and a time value of the geographic position. In this way, telematics data is able to define a state of vehicle and/or telematics device at a given point in time. As recorded, a telematics data record may comprise a single row of data as may be represented in a data table, relational database, or other data structure. In some embodiments, the telematics data may be associated with a particular user. For example, the telematics data may be associated with a driver or passenger of the vehicle (e.g., vehicle 108).

With respect to the embodiment of FIG. 2, telematics device 106 transmits (204) the telematics data (e.g., via network(s) 120) to telematics server 110. Telematics server 110 receives (e.g., via its external ports and/or communication modules 155) and processes the telematics data. Processing telematics data may refer to, but is not limited to, determining operating states of rideshare vehicles and/or generating rideshare-based risk profiles as descried herein, or performing pre-processing and/or post-processing analysis, such as determining start times for trip, positions, times, or other data or information as described herein, from the received telematics data. In some embodiments, processing telematics data may attach metadata to the telematics data records, or GUI values, where such metadata includes data generated, determined from, or otherwise resulting from the telematics data as received from telematics device 106.

In some embodiments, the telematics data may be pushed to the telematics server 110 from the telematics device 106 and/or a telematics app. In other embodiments, the telematics data may be pulled by the telematics server, upon request by the telematics server, from the telematics device 106.

In some embodiments, because of the large number of telematics data records generally received from telematics device 106, telematics server 110 may receive (e.g., via its external ports and/or communication modules 155) and process the telematics data using data efficient techniques. For example, in some embodiments, telematics data, as received by telematics device 106, is processed by telematics server 110 via an asynchronous process. In such embodiments, telematics server 110 may comprise a plurality of software components, including consumer components and producer components. The consumer components are implemented to receive and/or store (e.g., in memory 156 or data storage devices 132) incoming telematics data. The producer components are implemented to process the telematics data, for example, by compressing the telematics data into GUI values, or performing post-processing analysis as described herein.

In some embodiments, the consumer components and the producer components may be implemented via multiple computational threads, in a multi-threaded environment of the telematics server 110. In a multi-threaded environment, consumer components and producer components may operate at the same time so as to increase the throughput and efficiency of the processing of the telematics data as described herein.

Other embodiments for receiving and processing telematics data is contemplated herein, such that the telematics system and methods are not limited to consumer/producer embodiments. For example, in some embodiments, a single software component may be implemented for receiving and processing all telematics data. In certain embodiments, for example, telematics data could store telematics data in memory (e.g., in memory 156 or data storage devices 132), where a batch component of the telematics cloud form 110 could select certain amounts of telematics data to process at one time. In this way, such embodiments result in batch processing of received telematics data. In such embodiments, telematics server 110 may be configured to batch process the telematics data at specific time intervals (e.g., every minute, hour, day, etc.).

In still further embodiments, telematics data may be processed only when a request is received from a client device (e.g., mobile device of user) for the data. For example, a telematics mobile app executing on a mobile device, as described herein, may be configured to request data for a particular time period, which may cause the telematics server 110, e.g., via a client component, to process telematics data in real-time in order to respond to the request. It should be appreciated that portions of and/or combinations of any or all of the above embodiments may be used to process and receive telematics data as part of the telematics systems and methods as described herein.

With respect to FIG. 2, telematics server 110 receives (206), from the computer network, rideshare data originating from a rideshare app 201 configured to execute on the telematics device during one or more portions of the operating segment. The rideshare data may indicate a rideshare app mode for each portion of the one or more portions of the operating segment, the rideshare app mode selected from (1) a rideshare active mode, or (2) a rideshare inactive mode. In various embodiments, the rideshare active mode and/or rideshare inactive mode are important indicators or datasets as they indicate when a TNC (e.g., LFYT or UBER) is responsible for providing insurance (or otherwise responsible for damage or accidents caused by the rideshare driver), which may include when a driver has the rideshare app turned on (i.e., "rideshare active mode") as opposed to off (i.e., "rideshare inactive mode"). In some embodiments, the rideshare active mode may comprise subcategories or sub-modes including each of one or more of: (1a) phase 1: "app on," (1b) phase 2: "en route," and (1c) phase 3 "with a passenger." Each of these sub-modes made be included as part of the rideshare data and may be used in the determinations, calculations, or otherwise herein where the telematics data and/or rideshare data is computed, described, or otherwise used. For example, "app on' sub-mode may indicate that the mobile app is active. "En route" sub-mode may indicate that the rideshare driver is en route to a passenger. And "with a passenger" or "passenger" sub-mode may indicate that a passenger is currently in the vehicle of the rideshare driver.

In some embodiments, the rideshare app may transmit (207a) the rideshare data to remote platform 112, which may be a TNC platform of a TNC such as UBER or LYFT. In still further embodiments, the telematics server 110 may transmit (207b) the telematics data to remote platform 112. In still further embodiments, with respect to FIG. 2, a cloud-based vehicular telematics method for a TNC to automatically generate rideshare-based risk profiles of rideshare drivers of the TNC platform is disclosed. In such embodiments, the TNC platform (e.g., remote platform 112) may receive (207b), from a computer network (e.g., network 120), telematics data originating from one or more sensors traveling with a rideshare vehicle (e.g., vehicle 108) during an operating segment of the rideshare vehicle. The method may further include the TNC platform (e.g., remote platform 112) receiving (207a), from the computer network, rideshare data originating from a rideshare app configured to execute on the telematics device during one or more portions of the operating segment. The rideshare data may indicate a rideshare app mode for each portion of the one or more portions of the operating segment, the rideshare app mode selected from (1) a rideshare active mode, or (2) a rideshare inactive mode. The method may further include determining, at the TNC platform (e.g., remote platform 112), based on the telematics data, one or more operating states of the rideshare vehicle during the operating segment of the rideshare vehicle. Still further, the method may include generating, at the TNC platform (e.g., remote platform 112), based on the telematics data and/or the rideshare data, a rideshare-based risk profile of a driver of the rideshare vehicle. The rideshare-based risk profile including a rideshare driver score of the driver. In such embodiments, the TNC platform (e.g., remote platform 112) may generate a proxy risk model, as described herein, to generate the rideshare-based risk profile and/or rideshare driver score.

In various embodiments, telematics server 110 may execute the instructions to associate at least one of the telematics data or the rideshare data with a loss event associated with the rideshare vehicle. A loss event may be for example an event associated with damage or an insurance claim reporting damage. Such data may include tail factors (future payments on existing claims after 3 years), trend factors (estimates in overall trends in the frequency and severity of accidents over time), expense costs, and patterns in the loss development due to claims handling (specifically of an insurer's claims handling).

With respect to FIG. 2, telematics server 110 determines (208), based on the telematics data, one or more operating states of the rideshare vehicle during the operating segment of the rideshare vehicle. Operating states are described further herein with respect to FIG. 3.

Further, as shown with respect to FIG. 2, telematics server may also generate (210), based on the telematics data and/or the rideshare data, a rideshare-based risk profile of a driver of the rideshare vehicle. The rideshare-based risk profile may include a rideshare driver score of the driver. The rideshare driver score may be generated by a risk model. For example, as described with respect to FIG. 1B, telematics server 110 may include a risk model (e.g., risk model 152) configured to generate a rideshare-based risk profile of a driver of a rideshare vehicle, which may include a rideshare driver score of the driver as described herein. Risk model 152 may be implemented as a software application, component, object, or set of objects, e.g., of an object-oriented programming language, that implements predictive analytics with artificial intelligence, statistical analysis, or the like using the driver telematics data as input, such as feature input into a machine learning algorithm. The risk model 152 may receive telematics data (204) and/or rideshare data (206) from telematics device 106 implementing telematics mobile app during (or after the completion of) one or more vehicle trips or operating segments. In some embodiments, the risk model may be used by the telematics server to generate a rate or a discount associated with a product or service. In some embodiments, the rate or the discount may be a rate or discount of an insurance policy of the driver.

In various embodiments, a rideshare driver score of a driver may be generated using artificial intelligence or similar techniques, including statistical or regression analysis, machine-learning, natural networks, etc. For example, risk model 152 may be trained to predict or otherwise generate a rideshare driver score. In particular, risk model 152 may be a machine learning model used to predict or generate rideshare driver scores. Such machine learning model may be trained using a supervised or unsupervised machine learning program or algorithm. The machine learning program or algorithm may employ a neural network, which may be a convolutional neural network, a deep learning neural network, or a combined learning module or program that learns in two or more features or feature datasets in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. Machine learning may involve identifying and recognizing patterns in existing data (such as the quality or quantity of driving of a driver for one or more operating segments (or portions thereof) of a rideshare vehicle from the telematics data and/or rideshare data) in order to facilitate making predictions for subsequent data (to predict or generate a rideshare driver score).

Machine learning model(s), such as those of risk model 152, may be created and trained based upon example (e.g., "training data,") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

In FIG. 2, risk model 152 may use a driver's telematics data (e.g., telematics data 204) or rideshare data (e.g., rideshare data 206) as features to train the risk model 152's model against data labels that may include rideshare driving scores, such as past driving scores the driver or other rideshare drivers. Additionally, or alternatively, risk model may further be trained with a driver's telematics data (e.g., telematics data 204) or rideshare data (e.g., rideshare data 206) that includes quality of driving data. Quality of the telematics data may refer to the degree to which the driver demonstrated safe or acceptable driving behavior (or vice versa) as defined by the telematics data. For example, metrics such as hard breaking, speeding, swerving, and the like may be determined from the data. Quantity of the telematics data may refer to an amount of driving time as defined by the telematics data. The output of risk model 152 may be a rideshare driver score of the driver. Additionally, or alternatively, the output of risk model 152 may be a prediction of future loss or a predicted future loss experience of the driver. The predicted future loss or loss experience is based on a given driver's past telematics data (e.g., telematics data 204) and/or rideshare data (e.g., rideshare data 206) as determined by risk model 152. A proxy risk model of a TNC may be trained in a same or similar manner as described herein for risk model 152.

With respect to FIG. 2, in some embodiments, the rideshare driver score, rate, discount, or other data or information determined or generated by telematics server 110 may be transferred (212) to the telematics device 106 for display on a GUI thereon. For example, telematics server 110 may transmit to a telematics mobile application (app) 190 the rideshare driver score to report the score to the driver (or other end-user). The transmission may be made in real-time or near real-time as the driver operates during, and/or completes, vehicle trips. In addition, the telematics mobile application may render or generate a graphic user interface (GUI) on a display of the telematics device. The GUI may include one or more screens, including GUI control screens or controls, to allow for user manipulation of the telematics mobile application by a user, such as by a driver of one or more vehicles of the one or more vehicle trips. In various embodiments, the telematics mobile app is configured to render the rideshare driver score on the display via the GUI.

In various embodiments, telematics mobile app 190 may be a downloadable application that executes on a mobile device phone (e.g., mobile device 106*m*) or other personal electronic device. In some aspects, telematics mobile app 190 collects or causes to collect, telematics data as described herein. In some embodiments, during a collection period, telematics mobile app 190 does may not require a personal electronic device (e.g., mobile device 106*m*) to be mounted or otherwise affixed to the vehicle (e.g., vehicle 108). To this end, telematics mobile app 190 enables mobile device 106*m* and/or telematics server 110 to isolate the motion of the vehicle from the motion of the personal electronic device, as may be determined by the telematics data, via each respective device. As a result, telematics mobile app 190 is able to meaningfully interpret collected sensor or telematics data regardless of the particular orientation of mobile device 106*m*.

As described herein, telematics mobile app 190 may collect and transmit the telematics/sensor data to telematics server 110. Telematics server 110 is configured to analyze the telematics/sensor data to determine or generate information regarding the quality (e.g., how the vehicle was driven) and/or quantity (e.g., how much the vehicle was drive) of the data. For example, telematics server 110 may identify periods of time indicative of mobile device 106*m* being located within a vehicle in motion. As another example, the telematics server 110 may analyze the telematics/sensor data generated during the identified periods to determine driving performance, such as acceleration, braking, and/or cornering performance (e.g., quality of driving). Said another way, after the telematics data is received (204), telematics server 110 server processes the telematics/sensor data collected during a particular driving period or trip to derive driving information.

In various embodiments, telematics server 110 may implement a representative state transfer (RESTful) application programming interface (API) that exposes the telematics data and/or driver scores to be pushed and/or pulled via telematics mobile app 190 as descried herein. For example, in some embodiments, telematics mobile app 190 may access the rideshare driver score, and/or related data, by pulling or requesting such data from the RESTful API. In other embodiments, telematics mobile app 190 may access rideshare driver scores, and/or relate data, by receiving pushed GUI values from the RESTful API, where a connection, channel or session was established between telematics mobile app 190 and telematics server 110.

In some embodiments, the telematics mobile app 190 may leverage an API of the operating system executing on the personal electronic device to detect when the personal electronic device is in motion. For example, in some embodiments, telematics mobile app 190 may utilize the API to wake mobile device 106*m* in response to the operating system detecting a location change. To this end, the operating system may detect the major or significant location change by determining that the position of the mobile device 106*m* has moved a threshold distance or if a base station, in communication with, and servicing the mobile device 106*m* changes. Upon receiving an indication that the operating system detected the major location change, the telematics mobile app 190 may begin collecting, recording, and/or transmitting sensor or telematics data generated by sensors of the mobile device 106*m* or other sensors as described herein. Telematics mobile app 190 may then wait until mobile device 106*m* has been stationary for a threshold amount of time before the telematics mobile app 190 stops collecting sensor/telematics data.

In some embodiments, the operating system of mobile device 106*m*, via a third party or other API, may automatically report when the motion of the mobile device 106*m* is indicative of the mobile device 106*m* being located within a vehicle (e.g., vehicle 108) in motion (as opposed to being carried by an end user that is walking or biking). Upon detecting an API event indicating that the mobile device 106*m* is within a vehicle in motion, the telematics mobile app 190 may begin collecting telematics/sensor data generated by sensors of mobile device 106*m*. During a driving period, the telematics mobile app 190 may collect telematics/sensor data generated by various sensors of the mobile device 106*m*, or other sensors as describes herein, and may store the collected sensor data in application memory and/or transmits it to telematics server 110.

Additionally, in still further embodiments, the operating system, via a third party or other API, may also automatically report when the motion of mobile device 106*m* is indicative of mobile device 106*m* no longer begin within the vehicle in motion. Accordingly, in such embodiments, telematics mobile app 190 may cease recording the sensor data upon detecting the API event indicating that mobile device 106*m* is no longer within a vehicle in motion.

Figure 3:
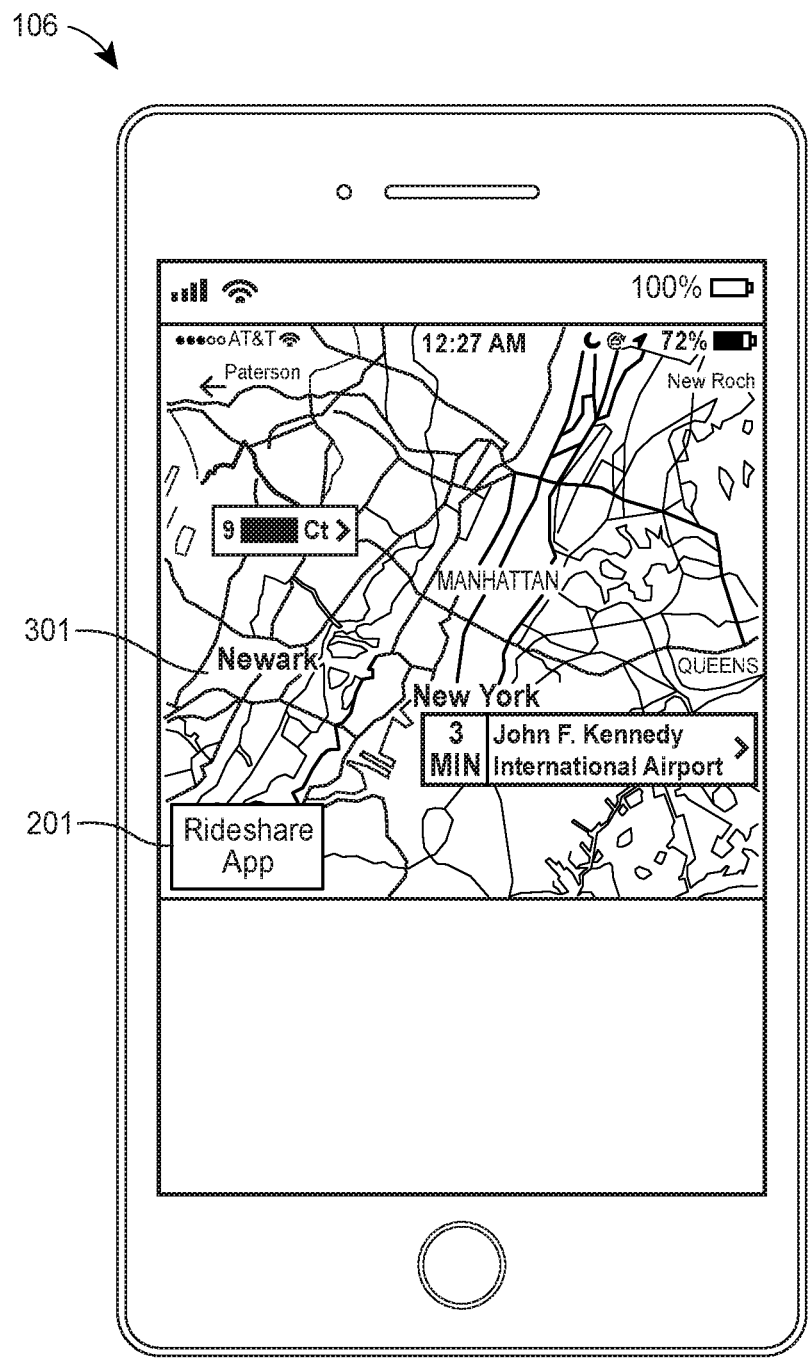
FIG. 3 illustrates a rideshare app rendering a graphic user interface (GUI) on a display of the telematics device of FIGS. 1A and 1B in accordance with various embodiments disclosed herein.

FIG. 3 illustrates rideshare app 201 rendering a graphic user interface (GUI) 301 on a display of the telematics device 106 of FIGS. 1A and 1B in accordance with various embodiments disclosed herein. In the embodiment, of FIG. 3, rideshare app 201 operates on a mobile telematics device 106 (e.g., mobile device 106*m*), such as a mobile smartphone as described herein. As depicted by rideshare app 201 of FIG. 3, a rideshare vehicle may in different geographic locations or near different points of interest. For example, rideshare app 201 shows operation of a rideshare vehicle within a proximity to an airport (e.g., John F. Kennedy International Airport) in New York. In addition, rideshare app 201 shows operation of a rideshare vehicle within a proximity to a geographic boundary (i.e., the New York and New Jersey state line boundary). During operation within proximity to the geographic locations and/or points of interest, telematics device 106, traveling with rideshare vehicle (e.g., vehicle 108), collects telematics data and rideshare app 201 collects rideshare data as described herein. Telematics data and/or rideshare data may be transmitted to telematics server 110 as described herein. In some embodiments, a risk model and/or a proxy risk model, as described herein, may be configured or trained to determine a rideshare per-mile insurance rate based on the rideshare driver's rideshare driver score and one or more operating states. As illustrated by FIG. 3, the one or more operating states may be selected from: (a) an airport state indicating that the rideshare vehicle is within a proximity to an airport, or (b) a geographic boundary state indicating that the rideshare vehicle is within a proximity to a geographic boundary. In some embodiments, an airport state or a geographic boundary state comprises an indication of whether the rideshare vehicle is within a (or not within) a property (e.g., property zone), region, or otherwise area corresponding to a given airport or geography.

For example, each of the risk model or proxy risk model may determine an operating state of the rideshare vehicle based on the telematics data and/or the rideshare data. The rideshare-based risk profile of the rideshare driver may depend, at least in part, on the operating state of the rideshare vehicle when the telematics data and/or rideshare data was collected. An operating state of the rideshare vehicle may correspond to a condition or location of the rideshare vehicle while the telematics data and/or rideshare data was collected. For example, an operating state may be an airport state indicating that the rideshare vehicle is within a proximity to an airport. For example, the proximity to the airport may correspond to a distance from an airport at which insurance coverage requirements and/or pricing changes. Risk model 152, using, for example, telematics data indicating the rideshare vehicle's location and/or rideshare data indicating the rideshare vehicle's geographic route, may determine that the rideshare vehicle is near or within a given proximity to an airport and therefore that the rideshare vehicle is in an operating state corresponding to an airport state.

Further, another operating state of the rideshare vehicle may be a geographic boundary state indicating that the rideshare vehicle is within a proximity to a geographic boundary. The geographic boundary may be, for example, a state line, a city line, a county line, territorial border, or national border. When the rideshare vehicle is near a geographic boundary, risk model 152 may determine, using, for example, telematics data and/or rideshare data indicating the rideshare vehicle's location, that the rideshare vehicle is within a given proximity to the geographic boundary and therefore that the rideshare vehicle is in an operating state corresponding to a geographic boundary state. Similarly, an operating state of the rideshare vehicle may be an out-of-state operating state indicating that that the rideshare vehicle is currently located in a state different from the origin point of a ridesharing trip. For example, an operating state of the rideshare vehicle may be an in-state operating state when a rideshare trip begins in State A, but may change to an out-of-state operating state when the rideshare vehicle crosses the state line en route to a destination in State B. While the rideshare vehicle is near the border between State A and State B, the operating state of the rideshare vehicle may also indicate that the rideshare vehicle is in a geographic boundary state. With reference to FIG. 3, the rideshare vehicle may be in both an airport state indicating its proximity to John F. Kennedy International Airport and a geographic boundary state indicating its proximity to the New York and New Jersey state line boundary. Other operating states may also be similarly determined based on proximity to selected locations.

Still further, based on the determined one or more operating states, each of the risk model or proxy risk model may adjust an insurance premium or rate, such as a rideshare per-mile insurance rate. For example, based on the rideshare-based risk profile of the rideshare driver, rideshare driver score, and determined operating states, the risk model or proxy risk model may determine that certain operating states are associated with a higher or lower level or risk that should be reflected with a higher or lower insurance premium or rate. For instance, a rideshare driver consistently associated with an airport state may be associated with a higher level of risk. More generally, if a rideshare driver is associated at higher than average rates with an operating state indicating proximity to a location associated with higher levels or risk, an insurance policy associated with the rideshare driver may be adjusted.

Figure 4:
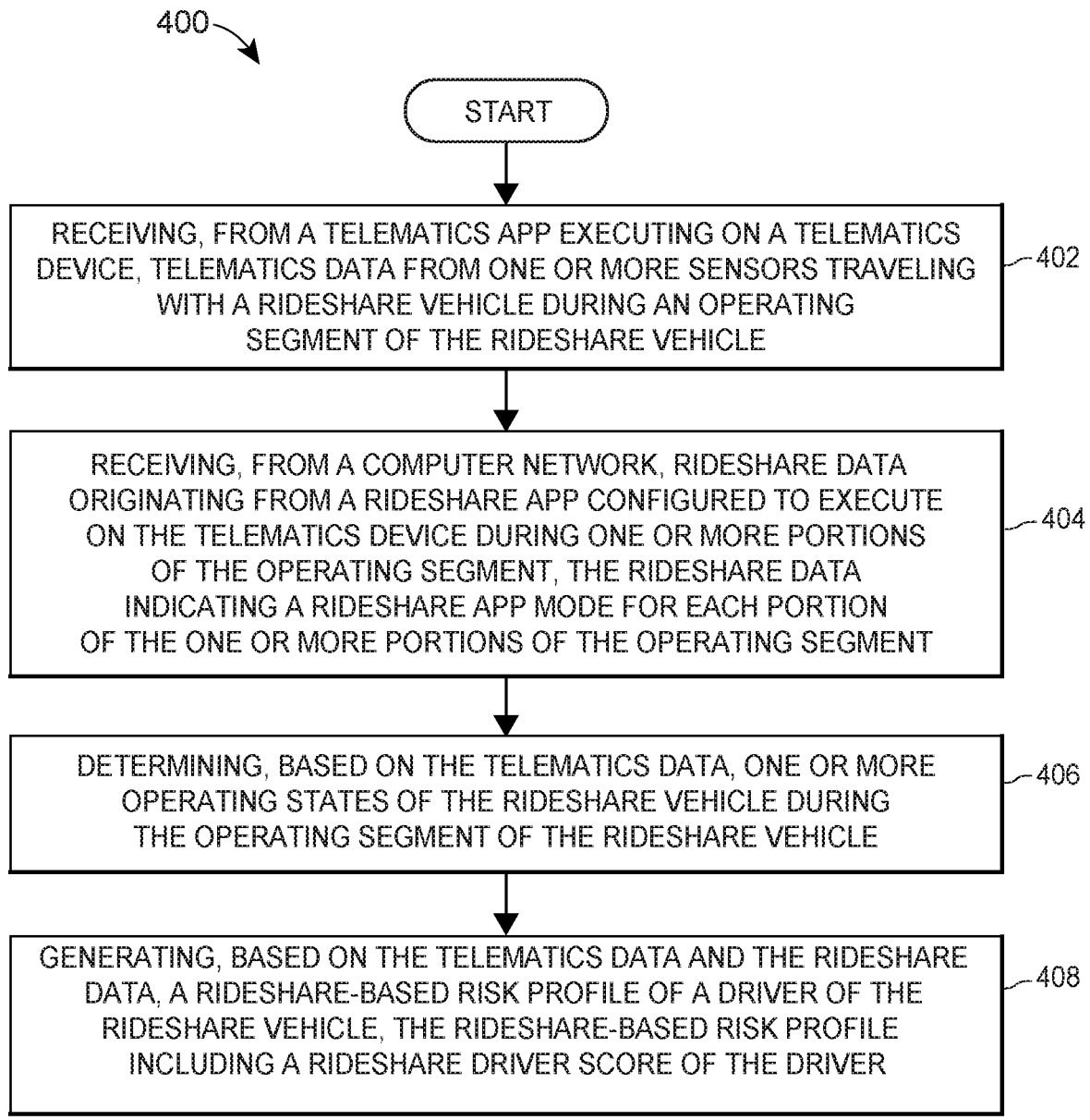
FIG. 4 illustrates a flow diagram of an exemplary telematics method for automatically generating rideshare-based risk profiles of rideshare drivers of a TNC platform in accordance with various embodiments disclosed herein.

FIG. 4 illustrates a flow diagram of an exemplary telematics method 400 for automatically generating rideshare-based risk profiles of rideshare drivers of a TNC platform in accordance with various embodiments disclosed herein. At block 402, method 400 includes receiving, from a telematics app (e.g., telematics mobile app 190) executing on a telematics device, telematics data from one or more sensors traveling with a rideshare vehicle (e.g., onboard vehicle 108) during an operating segment of the rideshare vehicle.

At block 404, method 400 includes receiving, from a computer network (e.g., networks 120), rideshare data originating from a rideshare app configured to execute on the telematics device during one or more portions of the operating segment. The rideshare data may indicate a rideshare app mode for each portion of the one or more portions of the operating segment. In various embodiments, the rideshare app mode may be selected from (1) a rideshare active mode, or (2) a rideshare inactive mode. In some embodiments, the rideshare active mode may comprise subcategories or sub-modes including each of one or more of: (1a) phase 1: "app on," (1b) phase 2: "en route," and (1c) phase 3 "with a passenger." Each of these sub-modes made be included as part of the rideshare data and may be used in the determinations, calculations, or otherwise herein where the telematics data and/or rideshare data is computed, described, or otherwise used.

At block 406, method 400 includes determining, based on the telematics data, one or more operating states of the rideshare vehicle during the operating segment of the rideshare vehicle. The operating states may include, for example, an airport state or a geographic boundary state as described herein, for example, with respect to FIG. 3.

At block 408, method 400 includes generating, based on the telematics data and/or the rideshare data, a rideshare-based risk profile of a driver of the rideshare vehicle. The rideshare-based risk profile may include a rideshare driver score of the driver, as described herein, for example, for FIG. 2.

In various embodiments, ride share driver scores may be generated by a risk model or a proxy risk model. For example, in one embodiment one or more processors of telematics server 110 may further execute instructions to generate, based on the telematics data or the rideshare data, a risk model. The risk model may be a risk model of a non-rideshare entity such as an insurance company. A non-rideshare company generally refers herein an entity that does not control, or that does not operate, a TNC platform. In addition, as described herein, the risk model may be configured to generate rideshare driver score(s) of rideshare driver(s). In other embodiments, the one or more processors of the telematics server further execute instructions to transfer the telematics data to the TNC platform (e.g., remote platform 112) of a rideshare entity. In such embodiments, the TNC platform may be configured to generate a proxy risk model based on the telematics data or the rideshare data. Just as the risk model of the non-rideshare entity, the proxy risk model may similarly be configured to generate a proxy rideshare driver score of the driver. The proxy risk model may be generated by the TNC, such as on the TNC platform (e.g., remote platform 112). In such embodiments, the proxy rideshare driver score may correspond to the driver score as generated by the risk model of the non-rideshare entity. Accordingly, both or either a risk model (of a non-rideshare entity) or a proxy risk model (of a rideshare entity) may be used to generate rideshare driver scores as described herein.

In various embodiments, each of the risk model or proxy risk model may be a machine learning-based model trained with the telematics data and/or the rideshare data, as described herein.

In various embodiments, each of the risk model or proxy risk model may be configured to determine, from the telematics data or the rideshare data, a driver sub-score of the driver, the driver sub-score comprising any one or more of: a qualitative driving model score of the driver, a quantitative driving model score of the driver, or a credit risk index (CRI) model score. In various embodiments, the driver sub-score comprises a least a portion of the rideshare driver score of the driver. For example, the driver sub-score may be included as part of the rideshare driver score and/or may be used to generate the rideshare driver score.

Each of the qualitative driving model score or quantitative driving model score of the driver may be a reflection of driving performance (i.e., how well a driver operates a vehicle during each rideshare trip). For example, the quantitative driving model score may be a numeric score or percentage indicating safety compared to other drivers. The quantitative driving model score may be based on telematics data indicating acceleration, braking, and/or cornering performance. For instance, the quantitative driving model score may be based on scores of acceleration, braking, and/or cornering performance, as determined based on the telematics data. Similarly, the qualitative driving model score corresponds to a qualitative assessment of driving performance. For example, the qualitative driving model score may be a description of the driver's driving performance as selected from a set of categories (e.g., "Excellent," "Good," or "Average"). The qualitative driving model score may also be a qualitative assessment of the driver's overall safety (e.g. "Extremely Safe," "Safe," or "Reckless").

Further, the CRI model score may be a reflection of the driver's current or predicted credit risk index. A credit risk index is an assessment indicating the likelihood the driver to repay a loan or to meet a payment obligation (e.g. an insurance payment obligation). For example, based on the telematics data, rideshare data, driver characterization dataset (discussed below), and/or additional data received at telematics server 110 from data storage devices 132 and/or remote platforms 112, each of the risk model or proxy risk model may determine the driver's current or predicted credit risk index. As an example, risk model 152 may determine that, given the driver's telematics data and/or rideshare data, the driver is likely to have a given CRI, or a CRI that is lower or higher than average.

In various embodiments, each of the risk model or proxy risk model may be configured to generate the rideshare driver score based on a driver characterization dataset corresponding to the driver. In such embodiments, the driver characterization dataset including one or more of: driver tenure, driver rating, driver motor vehicle report (MVR), geography, type of car, number of passengers, passenger ratings, types of trips, weather conditions, or road conditions. The driver characterization dataset may be received at telematics server 110 from one or more of mobile device 106m, telematics device 106i, sensors 118, data storage devices 132, and/or remote platforms 112, and may include the rideshare data originating from the rideshare app 201. Driver tenure, for example, may correspond to how long the rideshare driver has been a driver for a TNC or how long the rideshare driver has had a driver's license. The driver rating may be a rating the driver has on a ridesharing app (e.g., "four out of five stars) based on the driver's customer service and/or safe driving habits. A driver MVR is a report of driving history. For example, a driver MVR may be a report from Department of Motor Vehicles of the state where the driver is licensed indicating the driver's license status, previous convictions, previous traffic violations, and the like. Information concerning the number of passengers, passenger ratings, and types of trips may be included, for example, in the rideshare data received at the telematics server and originating from the rideshare app. Data indicating geography, weather, and road conditions may be received directly by telematics server 110 or may be determined based on correlating a time and/or geographic route of a rideshare trip included in the telematics and/or rideshare data with geography, weather, and road condition data included in the driver characterization dataset.

In various embodiments, each of the risk model or proxy risk model may be configured to adjust an insurance premium based on a first active insurance policy corresponding to the rideshare vehicle and a second active insurance policy corresponding to the rideshare vehicle. For example, in a first embodiment, the first active insurance policy may be associated with a first TNC (e.g., LYFT), and a second active insurance policy may be associated with a second TNC (e.g., UBER). Such a situation may arise if the rideshare driver operates the rideshare vehicle to provide rideshare services for more than one TNC (e.g., UBER and LYFT). In a second embodiment, first active insurance policy may be associated with a TNC (e.g., LYFT), and the second active insurance policy may be associated with the driver (e.g., an insurance policy of the driver). In a still further embodiment, the second active insurance policy may adjusted based on the first active insurance policy.

For example, each of the risk model or proxy risk model may receive indications, based on information from telematics server 110 or information received at telematics server 110 from data storage devices 132 and/or remote platforms 112, of the existence of multiple active insurance policies covering the rideshare vehicle. As discussed above, the insurance policies may be policies associated with a TNC or may be policies associated only with the particular rideshare driver. An insurance premium of one of these policies may be adjusted depending on the coverage of the other policies, as determined based on the information received at telematics server 110. For example, the information received at telematics server 110 may indicate that the active insurance policies covering the rideshare vehicle are providing duplicate or simultaneous coverage. For instance, a rideshare vehicle, when the rideshare app is in a rideshare inactive mode, may be covered both by an insurance policy of a TNC and an insurance policy of the driver. An insurance premium of the policy of the driver may be adjusted based on the duplicate or simultaneous coverage provided by the TNC policy, and vice versa. As another example, an insurance policy may be rated based on miles driven. The premiums of such a policy may be calculated using the total miles driven, even though some of these miles may also or instead be covered by a different insurance policy. The premium of the miles-based insurance policy may be adjusted to reflect the coverage provided by the other insurance policy or policies.

In additional embodiments, rideshare app modes may further include a sub-group travel mode. In such embodiments, each of the risk model or proxy risk model may be configured to determine an alternative insurance premium or an additional insurance premium based on the sub-group travel mode. The sub-group travel mode may indicate that the rideshare vehicle is performing a trip different from a typical rideshare trip performed by a rideshare driver to transport a rideshare passenger for a TNC or is performing a trip different from the types of trips covered by a particular TNC insurance policy. For example, the sub-group travel mode may indicate that the rideshare vehicle is being driven by a rideshare driver for the purpose of a delivery, such as a food delivery or a product delivery, rather than transportation of a rideshare passenger. A particular TNC insurance policy may only cover those trips where the rideshare drivers are transporting passengers. As another example, the sub-group travel mode may indicate that the rideshare vehicle is operating in an autonomous manner rather than being operated by the rideshare driver. Still further, the sub-group travel mode may indicate that the vehicle has been provided by a third party (e.g. a rental car company) and is covered by a separate insurance policy different from the TNC's insurance policy.

Each of the risk model or proxy risk model may determine that each sub-group travel mode is associated with a different level of risk. For example, a sub-group travel mode indicating that the vehicle is operating autonomously may be associated with a lower level of risk than when the vehicle is being operated by a rideshare driver. Based on this determination, an alternative insurance premium or additional insurance premium reflecting the lower or higher risk associated with the sub-group travel mode may be determined. Additionally or alternatively, each of the risk model or proxy risk model may determine that each sub-group travel mode is associated with duplicate coverage or gaps in coverage. Based on this determination, an alternative insurance premium or additional insurance premium may be offered to adjust for this duplication or gap in coverage.

Additional Considerations

With the foregoing, telematics data, and/or other data, including the types of data discussed elsewhere herein, may be collected or received by an insured's mobile device or smart vehicle, a telematics application running thereon, and/or an insurance provider remote server, such as via direct or indirect wireless communication or data transmission from a telematics application ("App") running on the insured's mobile device or smart vehicle, after the insured or customer affirmatively consents or otherwise opts-in to an insurance discount, reward, or other program. The insurance provider may then analyze the data received with the customer's permission to provide benefits to the customer. As a result, risk adverse customers may receive insurance discounts or other insurance cost savings based upon data that reflects low risk driving behavior and/or technology that mitigates or prevents risk to (i) insured assets, such as vehicles or even homes, and/or (ii) vehicle operators or passengers.

Additional aspects include an a telematics cloud platform receiving telematics data and/or geographic location data from a large number of mobile computing devices (e.g., 100 or more), and issuing alerts to those mobile computing devices in which the alerts are relevant in accordance with the various techniques described herein.

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Aspects of the Disclosure

The following aspects of the disclosure are exemplary only and not intended to limit the scope of the disclosure.

1. A cloud-based vehicular telematics system configured to automatically generate rideshare-based risk profiles of rideshare drivers of a transport network company (TNC) platform, the cloud-based vehicular telematics system comprising: a telematics mobile application (app) configured to execute on a telematics device, the telematics mobile app operable to collect telematics data from one or more sensors traveling with a rideshare vehicle during an operating segment of the rideshare vehicle; a telematics server communicatively coupled, via a computer network, to the telematics mobile application, the telematics server configured to receive the telematics data from the telematics mobile app during the operating segment; and a computer memory communicatively coupled the telematics server and storing instructions that when executed by one or more processors of the telematics server, cause the telematics server to: receive, from the computer network, rideshare data originating from a rideshare app configured to execute on the telematics device during one or more portions of the operating segment, the rideshare data indicating a rideshare app mode for each portion of the one or more portions of the operating segment, the rideshare app mode selected from (1) a rideshare active mode, or (2) a rideshare inactive mode, determine, based on the telematics data, one or more operating states of the rideshare vehicle during the operating segment of the rideshare vehicle, and generate, based on the telematics data and the rideshare data, a rideshare-based risk profile of a driver of the rideshare vehicle, the rideshare-based risk profile including a rideshare driver score of the driver.

2. The cloud-based vehicular telematics system of aspect 1, wherein the telematics mobile app is further configured to render a graphic user interface (GUI) on a display of the telematics device.

3. The cloud-based vehicular telematics system of aspect 2, wherein the GUI includes one or more GUI controls operable to allow user manipulation of the telematics mobile application by a user.

4. The cloud-based vehicular telematics system of aspect 3, wherein the telematics mobile app is configured to render the rideshare driver score on the display via the GUI.

5. The cloud-based vehicular telematics system as in one of aspects 1-4, wherein the one or more sensors are part of the telematics device.

6. The cloud-based vehicular telematics system as in one of aspects 1-5, wherein the one or more sensors are part of the rideshare vehicle.

7. The cloud-based vehicular telematics system as in one of aspects 1-6, wherein the sensors transmit telematics data wirelessly or wired to the telematics device.

8. The cloud-based vehicular telematics system as in one of aspects 1-7, wherein the telematics server is configured to receive the telematics data from the telematics device.

9. The cloud-based vehicular telematics system as in one of aspects 1-8, wherein the telematics data is pushed to the telematics server from the telematics mobile application.

10. The cloud-based vehicular telematics system as in one of aspects 1-9, wherein the telematics data may be pulled by the telematics server, upon request by the telematics server, from the telematics mobile application.

11. The cloud-based vehicular telematics system as in one of aspects 1-10, wherein the one or more processors of the telematics server further execute the instructions to generate a rate or a discount associated with a product or service.

12. The cloud-based vehicular telematics system of aspect 11, wherein the rate or the discount corresponds to an insurance policy of the driver.

13. The cloud-based vehicular telematics system as in one of aspects 1-12, wherein the one or more processors of the telematics server further execute the instructions to associate at least one of the telematics data or the rideshare data with a loss event associated with the rideshare vehicle.

14. The cloud-based vehicular telematics system as in one of aspects 1-14, wherein the one or more processors of the telematics server further execute the instructions to generate, based on the telematics data or the rideshare data, a risk model of a non-rideshare entity, the risk model configured to generate the rideshare driver score of the driver.

15. The cloud-based vehicular telematics system of aspect 14, wherein the risk model is a machine learning-based model trained with the telematics data or the rideshare data.

16. The cloud-based vehicular telematics system of aspect 14, wherein the risk model configured to determine, from the telematics data or the rideshare data, a driver sub-score of the driver, the driver sub-score comprising any one or more of: a qualitative driving model score of the driver, a quantitative driving model score of the driver, or a credit risk index (CRI) model score of the driver, and wherein the driver sub-score comprises a least a portion of the rideshare driver score of the driver.

17. The cloud-based vehicular telematics system of aspect 14, wherein the risk model is further configured to generate the rideshare driver score based on a driver characterization dataset corresponding to the driver, the driver characterization dataset including one or more of: driver tenure, driver rating, driver motor vehicle report (MVR), geography, type of car, number of passengers, passenger ratings, types of trips, weather conditions, or road conditions.

18. The cloud-based vehicular telematics system of aspect 14, wherein the risk model is further configured to determine a rideshare per-mile insurance rate based on the rideshare driver score and the one or more operating states, the one or more operating states selected from: (a) an airport state indicating that the rideshare vehicle is within a proximity to or within a property of an airport, or (b) a geographic boundary state indicating that the rideshare vehicle is within a proximity to or within a region of a geographic boundary.
19. The cloud-based vehicular telematics system of aspect 14, wherein the risk model is further configured to adjust an insurance premium based on a first active insurance policy corresponding to the rideshare vehicle and a second active insurance policy corresponding to the rideshare vehicle.
20. The cloud-based vehicular telematics system of aspect 19, wherein the first active insurance policy is associated with the TNC, and wherein the second active insurance policy is associated with a second TNC.
21. The cloud-based vehicular telematics system of aspect 19, wherein the first active insurance policy is associated with the TNC, and wherein the second active insurance policy is associated with the driver.
22. The cloud-based vehicular telematics system of aspect 21, wherein the second active insurance policy is adjusted based on the first active insurance policy.
23. The cloud-based vehicular telematics system of aspect 14, wherein the rideshare app mode further includes a sub-group travel mode, and further wherein the risk model is further configured to determine an alternative insurance premium or an additional insurance premium based on the sub-group travel mode.
24. The cloud-based vehicular telematics system of aspect 14, wherein the one or more processors of the telematics server further execute the instructions to transfer the telematics data to the TNC platform of a rideshare entity, the TNC platform configured to generate a proxy risk model based on the telematics data or the rideshare data, the proxy risk model configured to generate a proxy rideshare driver score of the driver, the proxy rideshare driver score corresponding to the driver score.
25. The cloud-based vehicular telematics system of aspect 24, wherein the proxy risk model is a machine learning-based model trained with the telematics data or the rideshare data.
26. The cloud-based vehicular telematics system of aspect 24, wherein the proxy risk model is configured to determine, from the telematics data or the rideshare data, a driver sub-score of the driver, the driver sub-score comprising any one or more of: a qualitative driving model score of the driver, a quantitative driving model score of the driver, or a credit risk index (CRI) model score of the driver, and wherein the driver sub-score comprises a least a portion of the rideshare driver score of the driver.
27. The cloud-based vehicular telematics system of aspect 24, wherein the proxy risk model is further configured to generate the rideshare driver score based on a driver characterization dataset corresponding to the driver, the driver characterization dataset including one or more of: driver tenure, driver rating, driver motor vehicle report (MVR), geography, type of car, number of passengers, passenger ratings, types of trips, weather conditions, or road conditions.
28. The cloud-based vehicular telematics system of aspect 24, wherein the proxy risk model is further configured to determine a rideshare per-mile insurance rate based on the rideshare driver score and the one or more operating states, the one or more operating states selected from: (a) an airport state indicating that the rideshare vehicle is within a proximity to or within a property of an airport, or (b) a geographic boundary state indicating that the rideshare vehicle is within a proximity to or within a region of a geographic boundary.
29. The cloud-based vehicular telematics system of aspect 14, wherein the proxy risk model is further configured to adjust an insurance premium based on a first active insurance policy corresponding to the rideshare vehicle and a second active insurance policy corresponding to the rideshare vehicle.
30. The cloud-based vehicular telematics system of aspect 29, wherein the first active insurance policy is associated with the TNC, and wherein the second active insurance policy is associated with a second TNC.
31. The cloud-based vehicular telematics system of aspect 30, wherein the first active insurance policy is associated with the TNC, and wherein the second active insurance policy is associated with the driver.
32. The cloud-based vehicular telematics system of aspect 31, wherein the second active insurance policy is adjusted based on the first active insurance policy.
33. The cloud-based vehicular telematics system of aspect 24, wherein the rideshare app mode further includes a sub-group travel mode, and further wherein the proxy risk model is further configured to determine an alternative insurance premium or an additional insurance premium based on the sub-group travel mode.
34. A cloud-based vehicular telematics method for automatically generating rideshare-based risk profiles of rideshare drivers of a transport network company (TNC) platform, the cloud-based vehicular telematics method comprising: receiving, from a telematics app executing on a telematics device, telematics data from one or more sensors traveling with a rideshare vehicle during an operating segment of the rideshare vehicle; receiving, from a computer network, rideshare data originating from a rideshare app configured to execute on the telematics device during one or more portions of the operating segment, the rideshare data indicating a rideshare app mode for each portion of the one or more portions of the operating segment, the rideshare app mode selected from (1) a rideshare active mode, or (2) a rideshare inactive mode; determining, based on the telematics data, one or more operating states of the rideshare vehicle during the operating segment of the rideshare vehicle; and generating, based on the telematics data and the rideshare data, a rideshare-based risk profile of a driver of the rideshare vehicle, the rideshare-based risk profile including a rideshare driver score of the driver.
35. A tangible, non-transitory computer-readable medium storing instructions for automatically generating rideshare-based risk profiles of rideshare drivers of a transport network company (TNC) platform, that when executed by one or more processors cause the one or more processors to: receive, from a telematics app executing on a telematics device, telematics data from one or more sensors traveling with a rideshare vehicle during an operating segment of the rideshare vehicle; receive, from a computer network, rideshare data originating from a rideshare app configured to execute on the telematics device during one or more portions of the operating segment, the rideshare data indicating a rideshare app mode for each portion of the one or more portions of the operating segment, the rideshare app mode selected from (1) a rideshare active mode, or (2) a rideshare inactive mode; determine, based on the telematics data, one or more operating states of the rideshare vehicle during the operating segment of the rideshare vehicle; and generate, based on the telematics data and the rideshare data, a rideshare-based risk profile of a driver of the rideshare vehicle, the rideshare-based risk profile including a rideshare driver score of the driver.

36. A cloud-based vehicular telematics method for automatically generating rideshare-based risk profiles of rideshare drivers of a transport network company (TNC) platform, the cloud-based vehicular telematics method comprising: receiving, from a computer network, telematics data originating from one or more sensors traveling with a rideshare vehicle during an operating segment of the rideshare vehicle; receiving, from the computer network, rideshare data originating from a rideshare app configured to execute on the telematics device during one or more portions of the operating segment, the rideshare data indicating a rideshare app mode for each portion of the one or more portions of the operating segment, the rideshare app mode selected from (1) a rideshare active mode, or (2) a rideshare inactive mode; determining, based on the telematics data, one or more operating states of the rideshare vehicle during the operating segment of the rideshare vehicle; and generating, based on the telematics data and the rideshare data, a rideshare-based risk profile of a driver of the rideshare vehicle, the rideshare-based risk profile including a rideshare driver score of the driver.

What is claimed is:

1. A cloud-based vehicular telematics system configured to automatically generate rideshare-based risk profiles of rideshare drivers of a transport network company (TNC) platform, the cloud-based vehicular telematics system comprising:
   a telematics mobile application (app) configured to execute on a telematics device, the telematics device traveling with a rideshare vehicle during an operating segment of the rideshare vehicle;
   a telematics server communicatively coupled, via a computer network, to the telematics mobile application, the telematics server configured to receive telematics data of one or more sensors from the telematics mobile app during the operating segment; and
   a computer memory communicatively coupled to the telematics server and storing instructions that when executed by one or more processors of the telematics server, cause the telematics server to:
      receive, from the computer network, rideshare data originating from a rideshare app configured to execute on the telematics device during one or more portions of the operating segment, the rideshare data indicating a rideshare app mode for each portion of the one or more portions of the operating segment, the rideshare app mode selected from (1) a rideshare active mode, or (2) a rideshare inactive mode,
      determine, based on the telematics data, a plurality of operating states of the rideshare vehicle during the operating segment of the rideshare vehicle, including determining a transition from a first operating state associated with a first portion of the operating segment and a second operating state associated with a second portion of the operating segment based upon at least a portion of the telematics data indicative of an environment in which the rideshare vehicle is operating, and
      generate, based on the telematics data and the rideshare data, a rideshare-based risk profile of a driver of the rideshare vehicle, the rideshare-based risk profile including a rideshare driver score of the driver.

2. The cloud-based vehicular telematics system of claim 1, wherein the telematics mobile app is further configured to render a graphic user interface (GUI) on a display of the telematics device.

3. The cloud-based vehicular telematics system of claim 2, wherein the GUI includes one or more GUI controls operable to allow user manipulation of the telematics mobile application by a user.

4. The cloud-based vehicular telematics system of claim 3, wherein the telematics mobile app is configured to render the rideshare driver score on the display via the GUI.

5. The cloud-based vehicular telematics system of claim 1, wherein the one or more sensors are part of the telematics device.

6. The cloud-based vehicular telematics system of claim 1, wherein the one or more sensors are part of the rideshare vehicle.

7. The cloud-based vehicular telematics system of claim 1, wherein the one or more processors of the telematics server further execute the instructions to generate a rate or a discount associated with a product or service.

8. The cloud-based vehicular telematics system of claim 1, wherein the one or more processors of the telematics server further execute the instructions to associate at least one of the telematics data or the rideshare data with a loss event associated with the rideshare vehicle.

9. The cloud-based vehicular telematics system of claim 1, wherein the one or more processors of the telematics server are further configured to execute the instructions to:
   (a) generate, based on the telematics data or the rideshare data, a risk model of a non-rideshare entity that lacks control of a TNC platform, the risk model configured to generate the rideshare driver score of the driver; or
   (b) transfer the telematics data to the TNC platform of a rideshare entity, the TNC platform configured to generate a proxy risk model based on the telematics data or the rideshare data, the proxy risk model configured to generate a proxy rideshare driver score of the driver, the proxy rideshare driver score corresponding to the driver score.

10. The cloud-based vehicular telematics system of claim 9, wherein each of the risk model and the proxy risk model is a machine learning-based model trained with the telematics data or the rideshare data.

11. The cloud-based vehicular telematics system of claim 9, wherein each of the risk model and the proxy risk model configured to determine, from the telematics data or the rideshare data, a driver sub-score of the driver, the driver sub-score comprising any one or more of: a qualitative driving model score of the driver, a quantitative driving model score of the driver, or a credit risk index (CRI) model score of the driver, and wherein the driver sub-score comprises a least a portion of the rideshare driver score of the driver.

12. The cloud-based vehicular telematics system of claim 9, wherein each of the risk model and the proxy risk model is further configured to generate the rideshare driver score based on a driver characterization dataset corresponding to the driver, the driver characterization dataset including one or more of: driver tenure, driver rating, driver motor vehicle report (MVR), geography, type of car, number of passengers, passenger ratings, types of trips, weather conditions, or road conditions.

13. The cloud-based vehicular telematics system of claim 9, wherein each of the risk model and the proxy risk model is further configured to determine a rideshare per-mile insurance rate based on the rideshare driver score and the plurality of operating states, he plurality of operating states selected from:
- (a) an airport state indicating that the rideshare vehicle is within a proximity to or within a property of an airport, or
- (b) a geographic boundary state indicating that the rideshare vehicle is within a proximity to or within a region of a geographic boundary.

14. The cloud-based vehicular telematics system of claim 9, wherein each of the risk model and the proxy risk model is further configured to adjust an insurance premium based on a first active insurance policy corresponding to the rideshare vehicle and a second active insurance policy corresponding to the rideshare vehicle.

15. The cloud-based vehicular telematics system of claim 14, wherein the first active insurance policy is associated with the TNC, and wherein the second active insurance policy is associated with a second TNC.

16. The cloud-based vehicular telematics system of claim 14, wherein the first active insurance policy is associated with the TNC, and wherein the second active insurance policy is associated with the driver.

17. The cloud-based vehicular telematics system of claim 16, wherein the second active insurance policy is adjusted based on the first active insurance policy.

18. The cloud-based vehicular telematics system of claim 9, wherein the rideshare app mode further includes a sub-group travel mode, and further wherein each of the risk model and the proxy risk model is further configured to determine an alternative insurance premium or an additional insurance premium based on the sub-group travel mode.

19. A tangible, non-transitory computer-readable medium storing instructions for automatically generating rideshare-based risk profiles of rideshare drivers of a transport network company (TNC) platform, that when executed by one or more processors cause the one or more processors to:
- receive, from a telematics app executing on a telematics device, telematics data from one or more sensors traveling with a rideshare vehicle during an operating segment of the rideshare vehicle;
- receive, from a computer network, rideshare data originating from a rideshare app configured to execute on the telematics device during one or more portions of the operating segment, the rideshare data indicating a rideshare app mode for each portion of the one or more portions of the operating segment, the rideshare app mode selected from (1) a rideshare active mode, or (2) a rideshare inactive mode;
- determine, based on the telematics data, a plurality of operating states of the rideshare vehicle during the operating segment of the rideshare vehicle, including determining a transition from a first operating state associated with a first portion of the operating segment and a second operating state associated with a second portion of the operating segment based upon at least a portion of the telematics data indicative of an environment in which the rideshare vehicle is operating; and
- generate, based on the telematics data and the rideshare data, a rideshare-based risk profile of a driver of the rideshare vehicle, the rideshare-based risk profile including a rideshare driver score of the driver.

20. A cloud-based vehicular telematics method for automatically generating rideshare-based risk profiles of rideshare drivers of a transport network company (TNC) platform, the cloud-based vehicular telematics method comprising:
- receiving, from a computer network, telematics data originating from one or more sensors traveling with a rideshare vehicle during an operating segment of the rideshare vehicle;
- receiving, from the computer network, rideshare data originating from a rideshare app configured to execute on a telematics device during one or more portions of the operating segment, the rideshare data indicating a rideshare app mode for each portion of the one or more portions of the operating segment, the rideshare app mode selected from (1) a rideshare active mode, or (2) a rideshare inactive mode;
- determining, based on the telematics data, a plurality of operating states of the rideshare vehicle during the operating segment of the rideshare vehicle, including determining a transition from a first operating state associated with a first portion of the operating segment and a second operating state associated with a second portion of the operating segment based upon at least a portion of the telematics data indicative of an environment in which the rideshare vehicle is operating; and
- generating, based on the telematics data and the rideshare data, a rideshare-based risk profile of a driver of the rideshare vehicle, the rideshare-based risk profile including a rideshare driver score of the driver.

* * * * *